United States Patent
Marini

[11] 3,818,306
[45] June 18, 1974

[54] STABILIZED POWER SUPPLY WITH TRANSFORMER ISOLATION

[75] Inventor: Roberto Marini, Milan, Italy

[73] Assignee: Societa Italiana Telecomunicazioni Siemens s.p.A., Milan, Italy

[22] Filed: Feb. 20, 1973

[21] Appl. No.: 333,744

[30] Foreign Application Priority Data
Feb. 18, 1972 Italy.................. 20728/72

[52] U.S. Cl.................. 321/2, 323/17, 323/DIG. 1
[51] Int. Cl. ........................................... H02m 3/32
[58] Field of Search .......... 307/297; 321/2; 323/17, 323/22 T, DIG. 1

[56] References Cited
UNITED STATES PATENTS

| | | | |
|---|---|---|---|
| 3,305,767 | 2/1967 | Beihl et al...................... | 323/DIG. 1 |
| 3,328,674 | 6/1967 | Bleicher........................ | 323/DIG. 1 |
| 3,383,584 | 5/1968 | Atherton....................... | 323/DIG. 1 |
| 3,564,384 | 2/1971 | Adler............................ | 323/DIG. 1 |
| 3,594,499 | 7/1971 | Sansone et al................. | 323/DIG. 1 |
| 3,670,234 | 6/1972 | Joyce............................. | 321/2 X |

OTHER PUBLICATIONS
28–Volt Flyback Switching Regulator, Delco Electronics Division, General Motors, Application Note 42, Dec. 1968, Page 2.

Primary Examiner—A. D. Pellinen
Attorney, Agent, or Firm—Karl F. Ross; Herbert Dubno

[57] ABSTRACT

A storage capacitor, periodically charged through a chopping transistor via an inductance which during cutoff of the transistor maintains the flow of charging current by way of a diode, energizes an output terminal through a d-c/a-c converter, a transformer and a rectifier in tandem therewith. A sensor responsive to the voltage (or current) on that terminal feeds one input of an analog-type first differential amplifier whose other input receives a constant reference voltage (or current) and whose output constitutes an error signal. A binary-type second differential amplifier compares this error signal with the output of a sawtooth-wave generator and, on detecting a coincidence therebetween, energizes a differentiation circuit which generates a turn-on pulse for the switching transistor; a turn-off pulse for that transistor is periodically produced by a gating circuit which also triggers the sawtooth-wave generator. Two pulse transformers galvanically separate the gating circuit and the switching transistor from the sawtooth-voltage generator and the associated amplifier and differentiation circuit.

3 Claims, 2 Drawing Figures

STABILIZED POWER SUPPLY WITH TRANSFORMER ISOLATION

CROSS-REFERENCE TO RELATED APPLICATION

This application discloses and claims subject matter partly disclosed in my copending application, Ser. No. 235,150, filed 16 Mar. 1972.

FIELD OF THE INVENTION

My present invention relates to a stabilized power supply wherein a substantially constant output voltage or current is derived from a storage capacitor which is intermittently charged with the aid of a periodically opened and closed electronic switch and, during open periods of that switch, continues charging through an inductance and a diode in series therewith.

BACKGROUND OF THE INVENTION

Systems of this general type has been disclosed in my above-identified copending application as well as in U.S. Pat. Nos. 3,594,499, 3,629,497 and 3,641,267. In these systems a relatively high supply voltage is stepped down with the aid of an intermittently closed electronic switch, referred to as a chopping transistor, to generate a substantially lower operating voltage for various stages of a television receiver, the chopping transistor being triggered by a fly-back pulse generated in the sweep-control circuit for a horizontal deflection yoke. The low-voltage output current is smoothed by a reactive circuit including a storage capacitor and a series inductance; as further disclosed in the patents referred to, this inductance may be the primary of a feedback transformer having a secondary which controls the chopping transistor whereas another secondary works into a rectifier to generate a high output voltage for an accelerating anode of the receiving CRT. During off-periods of the chopping transistor, the flow of charging current into the capacitor is maintained through a diode in a rectifying branch of the sweep circuit.

OBJECTS OF THE INVENTION

The general object of my present invention is to provide simple and effective means for stabilizing one of the electric output variables (voltage or current) of such a system whose magnitude depends on the duty cycle of the chopping transistor.

A more particular object is to provide such stabilizing means in a system in which the output variable to be stabilized is generated in a circuit that is galvanically isolated from the supply circuit including the chopping transistor.

SUMMARY OF THE INVENTION

The foregoing objects are realized, in accordance with my present invention, by the provision of a controller for modifying the duty ratio of the electronic switch referred to above as the chopping transistor. This controller includes a sloping-wave (e.g. sawtooth-voltage) generator and a comparator matching the output of that generator with an error signal derived from a voltage or current sensor in the output energized from the charge of the storage capacitor. The error signal is produced by another comparator receiving the sensor output along with a constant reference variable (voltage or current).

According to a more specific feature of my invention, the comparator generating the error signal is a differential amplifier of the analog type whereas the comparator matching that signal with the sloping wave is a differential amplifier of the binary type whose output is a square wave of constant amplitude. Though this square wave could be used directly to control the chopping transistor, I prefer to interpose a differentiation circuit between this binary amplifier and the chopping transistor in order to convert this square wave into a succession of short pulses or spikes, coinciding with its leading (or trailing) edges, that can be easily transmitted to the switching controller through an isolating transformer. Another set of pulses, periodically emitted by a gating circuit as described in my prior application, are transmitted to the controller which alternately opens and closes the electronic switch in response to these pulses. The sloping-wave generator is triggered by these periodically recurring switching pulses, or by another pulse train of the same cadence, advantageously via another isolating transformer whereby perfect galvanic separation of the output circuit and its sensor from the chopping transistor and the associated storage capacitor can be achieved.

BRIEF DESCRIPTION OF THE DRAWING

The above and other features of my invention will now be described in detail with reference to the accompanying drawing in which.

SPECIFIC DESCRIPTION

Figure 1:
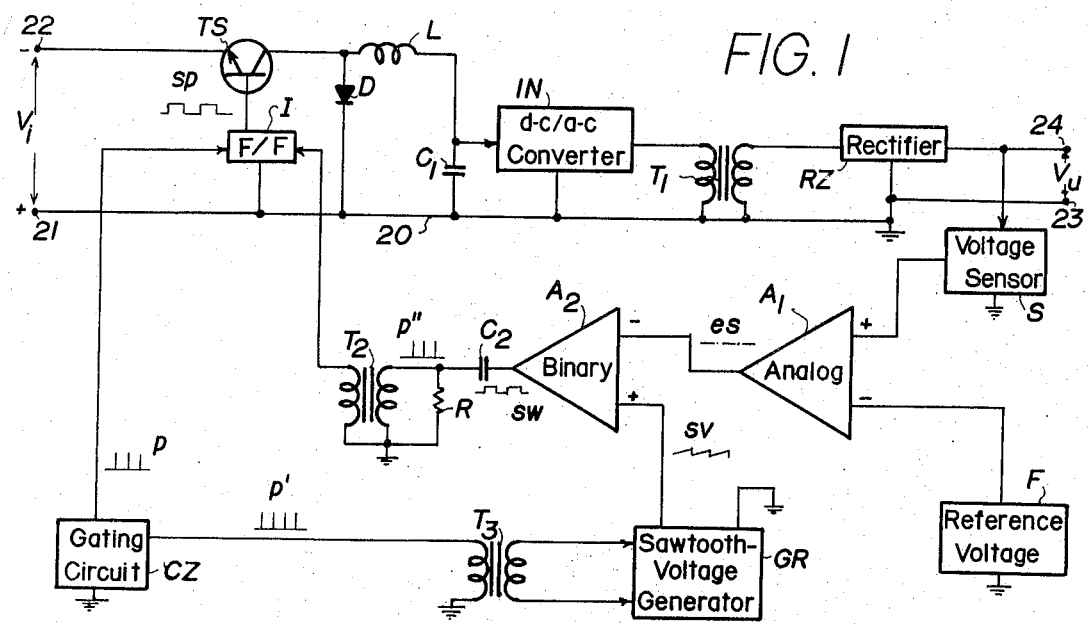
FIG. 1 is a circuit diagram of a voltage stabilizer embodying my invention.

The system illustrated in FIG. 1 comprises a grounded positive bus bar 20 extending between an input terminal 21 and an output terminal 23; a negative input terminal 22 is connected, e.g. by way of a nonillustrated low-pass filter, to a source of d-c voltage $V_i$ (e.g. on the order of 220 V) which is to be converted into a reduced output voltage $V_u$ (e.g. on the order of 30 V) appearing on an output terminal 24.

A chopping transistor TS has its emitter connected to a terminal 22 and its collector to the ungrounded plate of a storage capacitor $C_1$ by way of a series inductance L; an ancillary switch I, such as a flip-flop, intermittently energizes the base of the transistor TS to close a charging circuit for this capacitor. When transistor TS is cut off, charging current continues to flow through inductance L via a diode D. The capacitor voltage is therefore determined by the duty ratio of the transistor, i.e. by the proportion of its conductive and nonconductive periods during a switching cycle. This capacitor voltage energizes a d-c/a-c converter IN whose output, through a transformer $T_1$ and a full-wave rectifier RZ with the usual smoothing network, develops the output voltage $V_u$ between terminals 23 and 24.

The magnitude of output voltage $V_u$ is measured by a sensor S working into the additive input (+) of an analog-type differential amplifier $A_1$ whose substractive input (−) receives a constant reference voltage from a source F. The difference between these two voltages, therefore, gives rise in the output of amplifier $A_1$ to an error signal $es$ which is fed to the substractive input (−) of a binary-type differential amplifier $A_2$; the additive input (+) of amplifier $A_2$ receives a sawtooth voltage $sv$ from a generator GR which is triggered via a transformer $T_3$ by a train of timing pulses $p'$ periodically emitted by a gating circuit CZ.

Amplifier $A_2$ generates a square wave $sw$ from which a differentiation circuit, comprising a series condenser $C_2$ and a shunt resistor R, derives a train of sharp control pulses or spikes $p''$ which are fed by way of a transformer $T_2$ to the setting input of flip-flop I. The resetting input of that flip-flop receives from gating circuit CZ a train of pulses $p$ which occur in the rhythm of pulses $p'$ but do not necessarily coincide therewith. Chopping transistor TS is therefore turned on for variable saturation periods $sp$ whose leading edges occur at different times in a cycle, as determined by error signal $es$, whereas its trailing edges are equispaced. The relative timing of pulses $p$, $p'$ and $p''$, sawtooth voltage $sv$ and square waves $sp$, $sw$ has been illustrated in FIG. 2 which also shows the error signal $es$ whose intersection with sawtooth wave $sw$ gives rise to the spikes $p''$.

Figure 2:
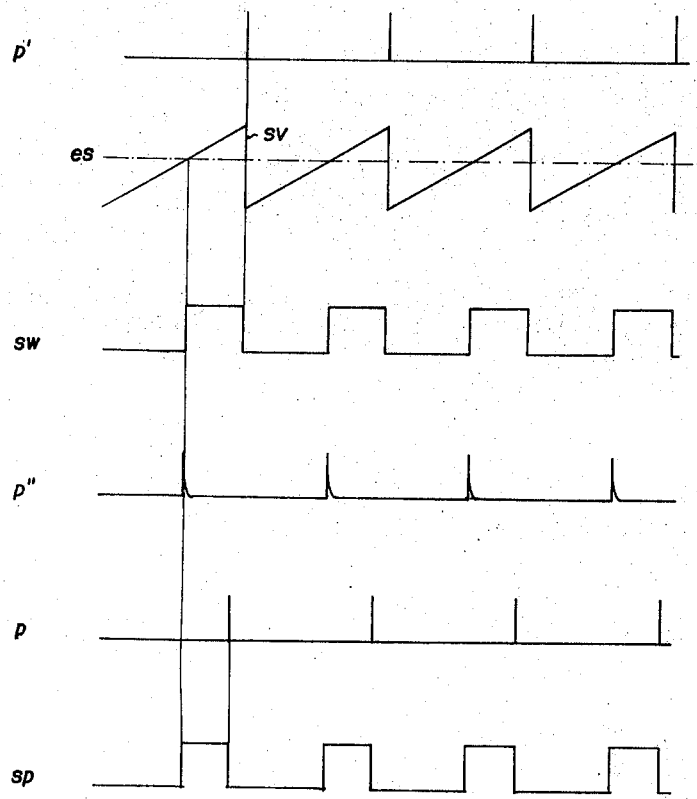
FIG. 2 is a set of graphs relating to the operation of the system of FIG. 1.

As will be apparent from FIG. 2, any increase in the error signal $es$ (due to a rise in output voltage $V_u$) delays the occurrence of spikes $p''$ and therefore shortens the periods of conductivity of transistor TS as determined by square wave $sp$. This reduces the duty ratio of the transistor and correspondingly lowers the charge of capacitor $C_1$ with consequent diminution of output voltage $V_u$ and error signal $es$.

Components RX, S, $A_1$, $A_2$ and GR are completely galvanically separated from elements CZ, I, TS, $C_1$ and IN by the three transformers $T_1$, $T_2$ and $T_3$.

I claim:

1. A stabilized power supply comprising:

a storage capacitor;

a high-voltage charging circuit for said capacitor including an inductance in series therewith;

electronic switch means in said charging circuit;

control means including a generator of a sloping wave establishing a constant operating cycle;

diode means connected to maintain the flow of a charging current into said capacitor via said inductance upon the opening of said switch means;

a d-c/a-c converter connected in a discharge path for said capacitor;

a low-voltage load circuit including rectifier means inductively coupled to said converter for energization thereby;

sensing means connected to the output of said rectifier means for measuring the magnitude of an electrical variable in said load circuit;

first comparison means connected to said sensing means and to a source of reference quantity for generating an error signal of a magnitude proportional to the difference between said variable and said reference quantity;

second comparison means connected to said first comparison means and to said generator for detecting a coincidence between said sloping wave and said error signal;

a source of periodically recurring gating pulses connected to said switch means for establishing a first operating condition thereof;

a differentiation circuit connected to said second comparison means for generating a succession of control pulses for said switch means upon said sloping wave reaching the level of said error signal;

a first pulse transformer coupling said differentiation circuit to said switch means for establishing a second operating condition thereof in response to said control pulses, the variable spacing of said control pulses from said gating pulses in successive operating cycles determining a duty ratio for said switch means varying inversely with the magnitude of said error signal to minimize the latter; and a second pulse transformer coupling said source to said generator for triggering same at the frequency of said gating pulses with galvanic isolation of said capacitor, said switch means and said source, on the one hand, from said load circuit, said sensing means, said first and second comparison means and said generator, on the other hand.

2. A power supply as defined in claim 1 wherein said switch means comprises a transistor provided with an ancillary switch for turning on said transistor in response to said control pulses and turning off said transistor in response to said gating pulses.

3. A power supply as defined in claim 1 wherein said first comparison means comprises a differential analog amplifier, said second comparison means comprising a differential binary amplifier.

* * * * *